Jan. 11, 1944.    C. F. HARTMAN    2,338,765
CENTERING DEVICE FOR DRILLS
Filed May 26, 1942
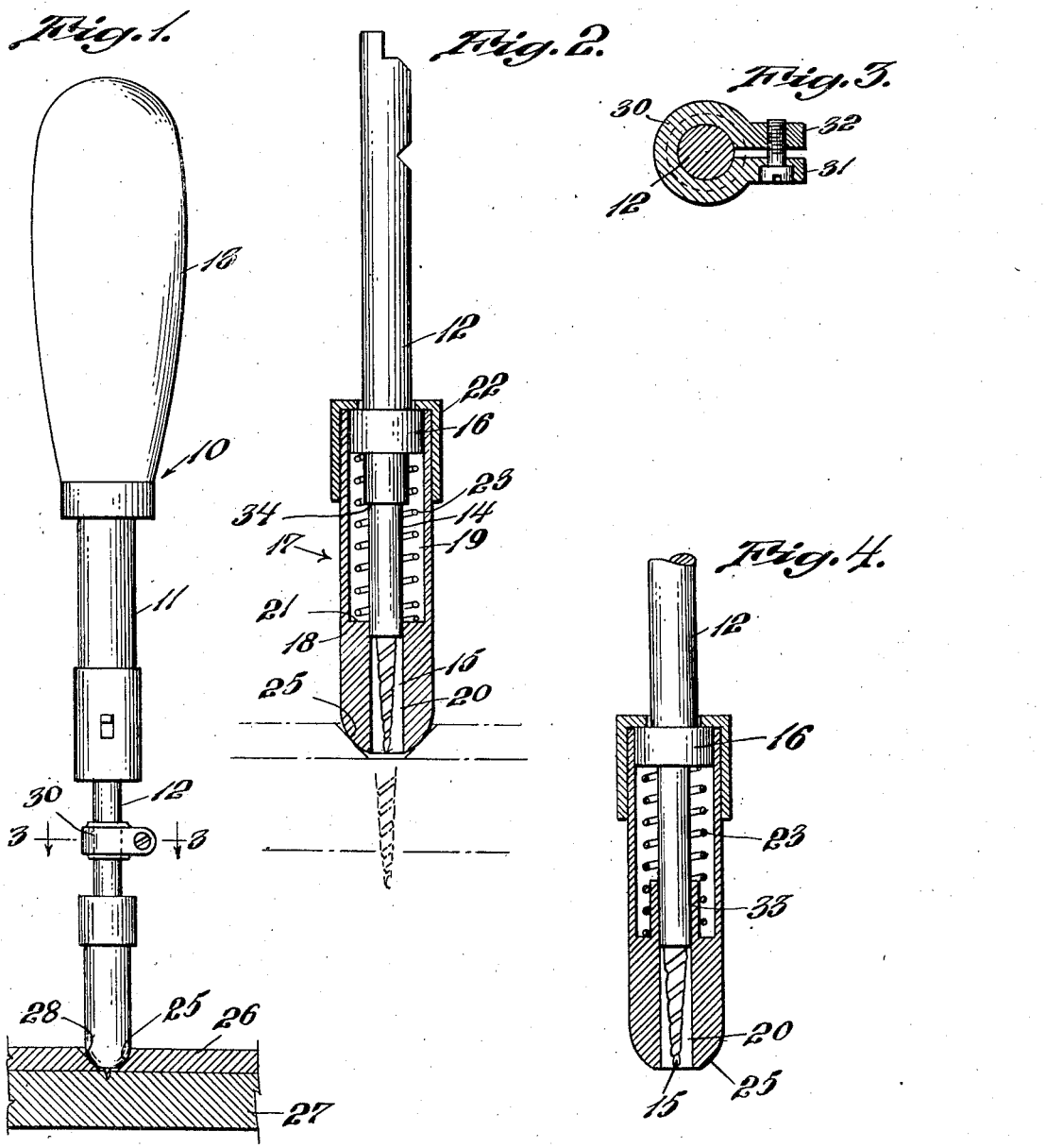
INVENTOR
Clifford F. Hartman
BY Barlow & Barlow
ATTORNEYS Patented Jan. 11, 1944

2,338,765

UNITED STATES PATENT OFFICE 2,338,765

CENTERING DEVICE FOR DRILLS

Clifford F. Hartman, Attleboro, Mass.

Application May 26, 1942, Serial No. 444,515

1 Claim. (Cl. 145—116)

This invention relates to a device for attachment to a drill, more particularly to the push type of portable instrument.

In boring for the attachment of hinges to woodwork and the like, it is frequently difficult to provide a hole directly aligning with the center of the opening through the hinge for guiding a screw which is to hold the hinge in place. Usually the opening is counterbored, but this is not essential for the operation of the device which is the subject of this invention.

One of the objects of this invention is to provide an arrangement so that the drill will be centered with reference to the opening through which the screw is to pass and through which the drill is to pass in boring such hole.

Another object of the invention is to provide an attachment for the portable push type drill which may be easily assembled on the shank thereof and which will center the drill with respect to some part through which the drill operates in boring a hole for a screw or the like.

Another object of the invention is to provide a device which telescopes over the drill and completely houses and protects the drill when not in use.

With these and other objects in view, the invention consists of certain novel features of construction, as will be more fully described and particularly pointed out in the appended claim.

In the accompanying drawing:

Fig. 1 is an elevation showing in section a fragmental portion of a member through which it is desired that the drill operate and the woodwork into which the drill is to extend.

Fig. 2 is a sectional view of my member illustrating the same as positioned on a shank and also showing in dotted lines the structure shown in Fig. 1.

Fig. 3 is a section on substantially line 3—3 of Fig. 1.

Fig. 4 is a view similar to Fig. 2 but illustrating a modified form of the invention.

In proceeding with this invention, I have provided a guide through which the drill may slide and by reason of the outside shape of its end will position the projecting drill point centrally of the opening into which the guide is set so that the drill will enter the stock at a location centrally of this opening that the screw may be located in proper position with reference to the part which it is to hold firmly in position.

With reference to the drawing, I have illustrated a push drill, designated generally 10, and shown in Fig. 1 as comprising a body part 11 in which there is a helically grooved shaft which will partake of rotary motion when the body is axially moved with reference to the shaft. A handle 13 serves to provide a convenient means for imparting this relative movement between the body and the shaft. The tool 12 which is coupled to the shank has a reduced portion 14 forming a shoulder 34 and is equipped with a drill 15.

A collar 16 is secured on this tool as shown in Fig. 2 and serves as a means for mounting the guide which is designated generally 17 and consists of a body 18 having a large central bore extending from its upper end and a smaller central bore 20 extending inwardly from its lower end. These two bores meet to provide a shoulder 21 between them which acts as a suitable abutment hereinafter mentioned. Bore 19 snugly fits the collar 16 while a cap 22 snugly frictionally fits the body to hold the body securely in position upon the shank and about the collar 16. Bore 20 is of a size to slidingly fit the portion 14 of the tool shank and extends a sufficient length so as to always be in engagement with this shank portion 14 throughout the stroke of the shank with reference to the body 11. A spring 23 engages the abutment 21 and also the under side of the collar 16 and is housed in the larger bore 19 so as to move the body 17 outwardly with reference to the shank 12. The lower end of this body 17 is roundingly arcuate as at 25 and symmetrical with reference to the center axis of the bore 20 and of the body 17 which is cylindrical.

If it is desired to secure the work piece 26 in Fig. 1 having a counterbored opening 28 therethrough to the wooden support 27, it being intended to put a wood screw into the piece 27, I position the tool equipped with my guide as shown in Fig. 1 into this countersunk opening 28 in a vertical position at right angles to the horizontal work piece and then by pressing upon the handle 13 the drill 15 would be forced downwardly and also given a rotary motion so as to bore a hole in the part 27. By reason of the rounded arcuate symmetrical shape of the guide end 25, the drill 15 would be perfectly centered with reference to the hole through the plate 26 so that when the screw is caused to enter the bore 27 it would be nicely centered and its bevelled head would fit perfectly into the countersunk opening 28.

The stroke of the shank is limited by shoulder 34.

In some cases it is desirable to additionally limit the depth to which the boring tool 15 might extend into the support 27 and for this purpose I have provided a collar 30 having ears 31 and 32 which may be moved together, to cause the collar 30 to bind upon the shank 12 and be held firmly in position. In this manner an abutment is provided on the tool shank which will engage the upper end of the guide 17 and limit the movement of the bit 15 into the support.

In Fig. 4 I have illustrated a modification which utilizes a collar 16 mounted on the shank 12 to mount the body 17. In this modification a sleeve 33 extends upwardly in the bore 19 extending the bore 20 in the lower part of the body. The spring 23 surrounds the sleeve and tightly fits the same to hold it in place. This sleeve 33 will abut the collar 16 to limit the relative movement of the tool and guide and provide a space for the contracted spring, or the collar 30 may be used for this purpose.

I have illustrated a manually operable push drill as a means for imparting rotary motion to the tool 12. However the tool may be conveniently secured to a clutch of a power drill press in an obvious manner and by providing the tool with properly formed drill end 15 the same may be made to operate on various materials including metals.

I claim:

An attachment for a drill having a shank provided with a reduced portion in the form of a cutting tool and adapted to be rotated and axially advanced, comprising a body adapted to be attached to said shank and having a bore extending therein from one end extremity thereof and a second bore of smaller dimension extending therein from the other end extremity thereof and with a portion of the wall surrounding said smaller bore extending a substantial distance into the larger bore, said smaller bore being of a dimension to slidably receive the shank throughout its stroke and being so related to said shank that a portion of said shank will always extend into said smaller bore, a collar fixed to said shank at a location thereon within said larger bore, a spring in said larger bore abutting the bottom wall thereof and said collar and surrounding said portion of the wall of said smaller bore extending into said larger bore, said body end about said smaller bore being of arcuate rounded shape symmetrical with respect to the axis of said bore, said collar being engageable with said wall portion surrounding said smaller bore for limiting the axial advance of said cutting element outwardly of said body.

CLIFFORD F. HARTMAN.